June 24, 1924.　　　　　　　　　　　　　　　1,499,281
F. ALTIERI
INDIVIDUAL BEVERAGE PERCOLATOR
Filed May 10, 1923
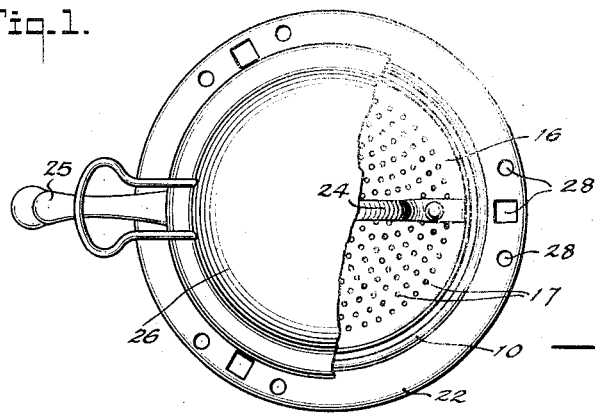
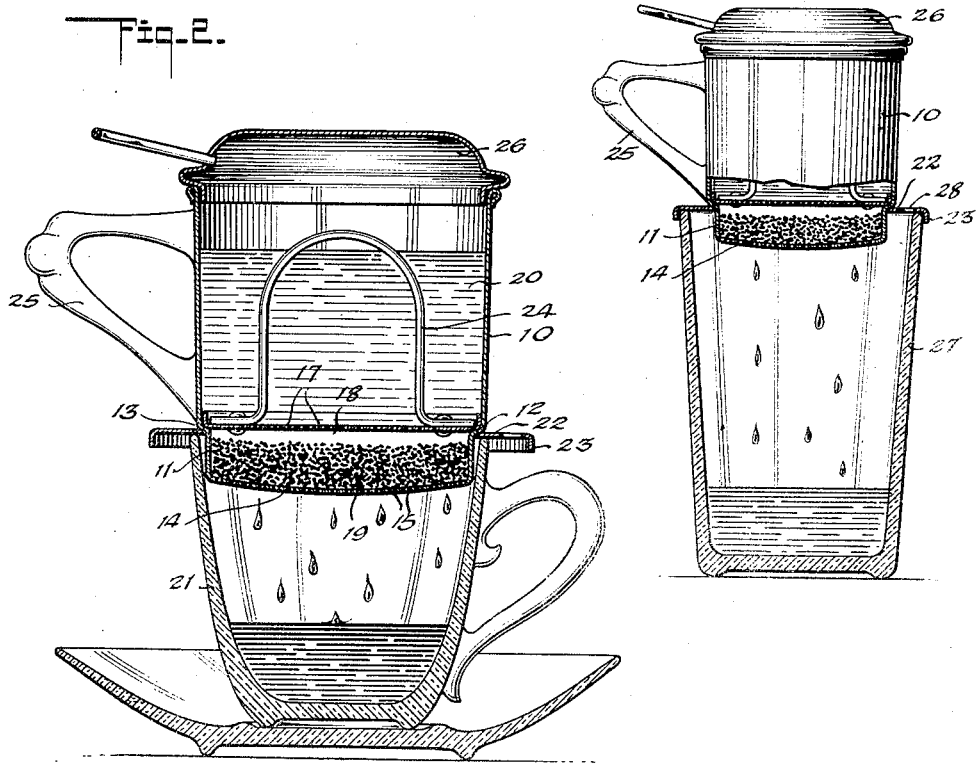
WITNESSES
Frederick Diehl.
INVENTOR
FRANK ALTIERI
BY
ATTORNEYS Patented June 24, 1924.

1,499,281

UNITED STATES PATENT OFFICE.

FRANK ALTIERI, OF BROOKLYN, NEW YORK.

INDIVIDUAL BEVERAGE PERCOLATOR.

Application filed May 10, 1923. Serial No. 638,092.

*To all whom it may concern:*

Be it known that I, FRANK ALTIERI, a citizen of the United States, and a resident of the city of New York, borough of Brooklyn, in the county of Kings and State of New York, have invented a new and Improved Individual Beverage Percolator, of which the following is a full, clear, and exact description.

This invention has relation to a device for producing beverages by percolation and has particular reference to an individual coffee percolator.

The outstanding object of the present invention is to provide a simple and inexpensive device by means of which a beverage or other hot liquid food may be produced by percolation in a cup, glass or other similar receptacle in order that the user may be assured of a fresh drink or liquid food.

The invention further contemplates a device of the character described which may be readily freed of the residue and the elements thereof properly cleansed after use.

With the above recited and other objects in view, the invention resides in the novel construction set forth in the following specification, particularly pointed out in the appended claim and illustrated in the accompanying drawing, it being understood that the right is reserved to embodiments other than those actually illustrated herein to the full extent indicated by the general meaning of the terms in which the claim is expressed.

In the drawing—

Figure 1 is a plan view of the percolating device, parts being broken away to disclose the underlying structure.

Fig. 2 is a vertical sectional view therethrough illustrating the same in applied position to a cup.

Fig. 3 is a similar view illustrating the same in applied position to a glass.

Referring to the drawing by characters of reference the percolator comprises a substantially cylindrical body 10 having a lower end 11 of reduced circumferential dimension to provide an internal annular shoulder 12 and an external annular shoulder 13. The lower end of the body 10 is closed by a bottom wall 14 which is formed with a plurality of perforations or openings 15. A partition 16 having a plurality of perforations or openings 17 is provided which is of an appropriate size to snugly fit within the upper enlarged portion of the body 10 and rest upon the internal shoulder 12 for spacing the same in superposed relation to the bottom wall 14. The bottom wall 14, reduced end 11 and partition 16 provide a chamber 18 for the reception of a beverage or food producing substance 19 whereby when hot water or liquid 20 is introduced through the upper open end of the body 10, the same will gravitate downwardly through the openings 17 in the partition 16, percolate through the substance 19 and thence through the perforations or openings 15 in the bottom 14 to extract the essence of the substance 19 and produce the beverage or liquid food. The lower reduced end 11 of the body is of an appropriate size to snugly fit within the upper end of a cup 21 in order that the beverage or liquid food will be directly received therein for use. In order to support the device from the upper edge of the cup, an annular flange 22 having a downturned outer marginal rim 23 is secured to the body 10 immediately below the external shoulder 13. In order to facilitate the lifting and removal of the partition 16 from the body 10, the same is preferably formed with an upstanding bail or handle 24. The body 10 is also preferably provided with a handle 25 and a suitable closure or cover 26 is adapted to be arranged over the upper end of the body. In event the device is to be used in connection with a glass 27, as illustrated in Fig. 3, the downturned rim 23 of the flange 22 is designed to telescopically engage over the upper edge of the same. To prevent cracking of the glass, the flange is preferably formed with heat or steam escape openings 28.

In use and operation when coffee or another beverage is to be served, the ground coffee is disposed in the lower reduced end 11 of the body 10 and the partition 16 is arranged thereover. The device is arranged and supported in the upper end of the cup and boiling water is poured into the body 10 after which the closure or cover 26 is arranged in place. In this manner the coffee or beverage is served to the patron of a restaurant and left standing an appropriate length of time to permit of the percolation of the water through the ground coffee, after which the device is removed by means of the handle 25. This insures to the patron or user a fresh hot cup of coffee or demi-tasse. The percolator when removed from the table is readily freed of the coffee grounds or residue by removing the cover or closure 26 and the partition by means of the bail 24. The percolator may then be readily cleansed and washed for subsequent use.

I claim:

An individual percolator comprising a cup shaped body having a perforated bottom and having its lower end portion reduced in size for the reception of beverage or beverage producing substance, a perforated partition arranged in superposed relation to the bottom of the body above the reduced end portion, a cover on the body, and an annular flange having steam outlet openings therein arranged on the exterior of the body at the upper end of the reduced portion thereof to support the body on a receptacle.

FRANK ALTIERI.